US006611351B1

(12) United States Patent
Simonoff

(10) Patent No.: US 6,611,351 B1
(45) Date of Patent: Aug. 26, 2003

(54) METHOD OF PRINTING COMPLETE MICR CHECKS ON BLANK SHEETS FROM HOST PROGRAM DATA USING LASER PRINTERS

(76) Inventor: Jerome Simonoff, 65 Cornell Dr., Plainview, NY (US) 11803

( * ) Notice: Subject to any disclaimer, the term of this patent is extended or adjusted under 35 U.S.C. 154(b) by 0 days.

(21) Appl. No.: 08/533,061

(22) Filed: Sep. 25, 1995

Related U.S. Application Data

(62) Division of application No. 08/113,683, filed on Aug. 28, 1993.

(51) Int. Cl.[7] ................................................ G06F 15/00

(52) U.S. Cl. ...................................... 358/1.18; 358/1.14

(58) Field of Search ................................ 395/117, 148, 395/149, 108; 400/61, 105, 718; 283/57–59; 364/401, 408; 235/379, 432; 358/1.18; 705/35, 45, 70; 707/527

(56) References Cited

U.S. PATENT DOCUMENTS 4,948,174 A * 8/1990 Thomson et al. ............. 283/58
5,053,955 A * 10/1991 Peach et al. ................ 364/401
5,085,470 A * 2/1992 Peach et al. .................. 283/58
5,121,945 A * 6/1992 Thomson et al. ............. 283/58
5,274,567 A * 12/1993 Kallin et al. ................ 364/478
5,321,604 A * 6/1994 Peach et al. ................ 364/401

* cited by examiner

*Primary Examiner*—Gabriel Garcia
(74) *Attorney, Agent, or Firm*—Pennie & Edmonds LLP

(57) ABSTRACT

An improved method for accurately and correctly encoding and printing complete checks on blank paper sheets with data derived from a host check printing program which may employ partially preprinted check forms. The method includes forming, in computer memory, a matrix array representative of the information printed by the host program. Intercepting the print check data generated by the host program. Deciphering and reformatting such host check data with other check information stored in a control file. The control file information is keyed to a selected assigned series of check numbers stored in a control file and extracted based on the check number of the check being processed. Checks are printed on blank paper sheets using the host check data under the control of a separate program that includes printing MICR information with magnetic ink in MICR font.

15 Claims, 2 Drawing Sheets

METHOD OF PRINTING COMPLETE MICR CHECKS ON BLANK SHEETS FROM HOST PROGRAM DATA USING LASER PRINTERS

CROSS-REFERENCE TO RELATED APPLICATION

This is a Division of application Ser. No. 08/113,683 filed Aug. 28, 1993.

BACKGROUND OF THE INVENTION

1. Field of the Invention

The present invention relates generally to imprinting complete checks and more particularly pertains to a method of encoding and printing complete checks on blank paper sheets with data derived from a host program which is designed to use preprinted check forms.

2. Description of the Prior Art

In the past both personal and business checks have been produced by printing presses and the like. Such checks, on their face, include at the least all the necessary information pertaining to the issuing bank and the drawer or payor of the check. In addition, the check also bears a series of magnetic ink characters identifying the issuing bank and the drawer and other information for later processing of the check by banks and the Federal Reserve System. The magnetic ink characters must be located within a specific area on the check. The payor fills in the check number, the dollar amount of the check, the name of the payee and the date.

There are presently available computer programs (hereinafter referred to as "host programs") offered by various software manufacturers which print checks on a computer printer. These host programs include accounting and related software, and generally require pre-printed check forms as described above. Such pre-printed check forms include information such as the name/address of the issuing financial institution, name/address of the account (drawer), financial institution transit numbers and coded information imprinted in conformance with MICR standards.

Pre-printed checks as described above are generally produced in large quantities in order to lower the unit cost. This, however, restricts any run of checks to a specific bank, one drawer and one account (number). Therefore, the drawer can only issue checks on one bank and one account for each series of printed checks. In order to issue checks on multiple banks or accounts it is necessary to have specific checks printed for each variation. Since business organizations operate under multiple styles and maintain various accounts at different banks they must, of necessity, stock a plurality of check forms. This is both costly and time consuming.

Checks and other similar commercial documents are required to meet and conform to certain standards. One such standard is Standard X9.27 entitled "Print Specifications for Magnetic Ink Character Recognition" and referred to as "MICR". This standard is issued by the Accredited Standards Committee on Financial Services under the procedures of the American National Standards Institute and published by the X9 Secretariat of the American Bankers Association. The specification sets forth the specific type fonts and special magnetic characteristics of the printed characters that must be used in the printing of these documents.

Laser printer technology has advanced to the point at which special toners and fonts can be used to laser print checks that meet MICR standards directly as outputted from a computer. Presently available computer software programs are capable of printing MICR encoded checks on partially imprinted check forms. Programs are available to produce checks 1) on a stand alone basis in which the check data is re-entered for each individual check, 2) as a separate step for printing checks from a data file provided by a host program such as an accounting program, and 3) by altering the software of the host program. The first method is relatively slow and time consuming. The second method requires that the host program produce a separate file from which data is extracted to print checks. The last method requires an alteration for each new version of the host software. Since such host programs are constantly revised and improved, the check software must be continually updated in order to conform to each new version.

There are a multitude of different accounting programs (host) each of which may include Accounts Payable and Payroll functions that produce checks. In addition to the foregoing, there exist many non-accounting programs such as stand alone check writing programs to name a few. With all these different available programs, it would be highly desirable to be able to print checks on blank stock paper without any preprinting. This procedure would be cost effective in that there would be no need to interrupt a check issuing program in order to insert and align a new preprinted check form for each change of the check preprinted matter. Thus, a user of a computer program which permits the use of blank or partially printed stock paper on which checks are printed, can employ host software supplied by different manufacturers for the printing of all his checks. For example, the user may employ a first program for his Accounts Payable and a second unrelated Payroll program. The printing of checks on blank paper is beneficial for those situations in which programs are updated on a regular basis. This is especially true in the case of Payroll programs since they must conform to the ever changing payroll tax requirements.

A user may employ a single host program to print checks from several different checking accounts using preprinted forms. The operator must stop and align the form for each change of account. The operation may even print a check on the wrong account thus creating a problem since funds will be disbursed from the incorrect account. For these reasons it is desirable to print the contents of a check directly onto a blank paper check sheet thereby eliminating the foregoing problems.

SUMMARY OF THE INVENTION

The present invention comprises a method of accurately and properly printing a check on a blank paper sheet from a check issuing host program which program is designed to print checks on a partially preprinted check form. It also includes the proper and accurate positioning of specific magnetic ink characters on the face of the check with a laser printer.

The method of the present invention can be summarized in a method which in its broadest aspect, includes at least the following steps 1) installing onto a computer a host program adapted for printing checks; 2) instructing the host program to print out at least one check; 3) intercepting the initial check data being sent to the printer; 4) identifying the host check data in a row/column matrix array format as such data appears on the printed check and entering such rows/columns into a control file; 5) storing the control file in a non-volatile memory such as a disk file; 6) activating the host program to process its data and to print out checks therefrom; 7) intercepting at the system operating level, the host program print data for each individual check page; 8) building a matrix in computer memory representing the check data from the host program wherein each printed line equals a row and each horizontal print position equals a column; 9) interpreting the intercepted host check data by using the matrix format specification (rows/columns) previously entered in the control file; 10) reformatting the host check data into a check format while directing the reformatted data to a printer; and, 11) repeating steps 7 through 10. Steps 1 through 4 represent a one time initial installation procedure.

The method described above can also be practiced by substituting the following procedure for steps 2 through 4; 2) printing out a host program check on to a row/column matrix array or printing out a host program check and overlaying the printed check with a transparent row/column array; 3) creating a control file and inputting therein in row/column matrix array the printed check data derived from step 2 above.

Preprinted check forms generally have printed thereon the name and address of the bank on which the check is to be drawn, the name and address of the drawer, the account number as well as the MICR information. Where such a partially or a fully preprinted check form is utilized by the host program then only current variable data need be printed on the form to complete the check. The host program should be capable of supplying such current data which includes, at the least, the following current print data in order to complete the preprinted check; 1) check date; 2) payee; 3) dollar check amount; and 4) check number. Therefore, if a check is to be printed on a blank sheet instead of a preprinted check form the following additional check data must be available; 1) name/address of financial institution; 2) name/address of payor; 3) MICR data; and, 4) account number.

By assigning a separate sequential series of check numbers for each bank account used by the host program, the different available bank accounts can be distinguished. Each series of check numbers are made to start with different initial check number digits. These initial digits are indicative and relate to a particular bank account. For example, Bank A may be assigned checks numbered from 120000 to 129999, Bank B assigned checks 130000 to 139999, etc. The additional information specified above for each bank is initially stored in memory or on a disk, for example in a lookup table indexed according to the initial check number digits. The additional bank information stored in the lookup table is read when such bank data is needed for printing of blank checks from a host program.

Accordingly, it is an object of this invention to provide an improved method for imprinting a check on a blank paper sheet from a host check printing program using a laser printer.

Another object of this invention is to provide a method for the printing of a check from data extracted from a host check printing program.

Still another object is to provide an improved method for printing of a complete check from a host check printing program using a terminate-and-stay resident program.

A further object of the present invention is to provide a reliable, positive and low cost method for imprinting complete checks for various bank accounts wherein the bank account information is linked to assigned check numbers.

Other objects and many of the attendant advantages of this invention will be readily appreciated as the same becomes better understood by reference to the following detailed description when considered in connection with the accompanying drawings in which like references numerals designate like parts throughout the figures thereof.

DETAILED DESCRIPTION OF THE PREFERRED METHOD

Figure 1:
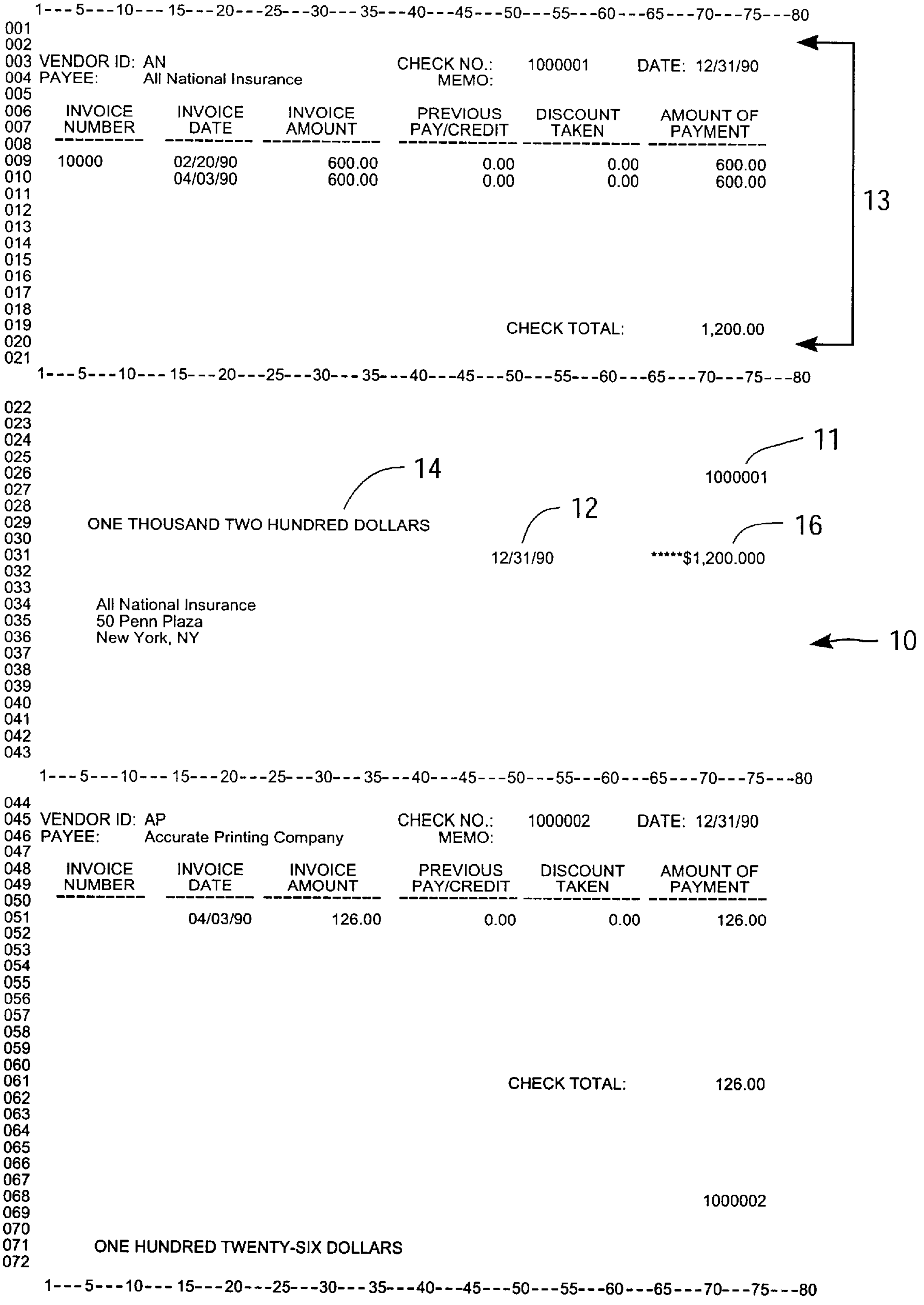
FIG. 1 is a representation of a matrix indexed check printed by a commercial host program suitable for the practice of the method of this invention.

Currently available computer software host programs such as those that use partially preprinted check forms and generally complete the preprinted check by printing thereon data currently inputted from the host program module. Such inputted data may be from, for example, an Accounts Payable module and involve the issuance of a check in payment for goods purchased. This host program printed data, at the least, includes the check number, the payee, the dollar amount of the check, and the date. All the remaining check information is preprinted on the check form. In the practice of the method of this invention by a separate computer check program, the host program is initially installed on a suitable computer. It is then necessary to ascertain the placement and arrangement of the printed check data from the host program within a row/column matrix array. For this purpose the printing of such a matrix array can be accomplished by having the separate check program (such as a terminate and stay resident program) intercept the installed host program when it prints out a check. This process includes intercepting the host program print data being directed to a printer and printing the host check data on a blank sheet while at the same time generating and printing row and column indices. Alternately the same array information may be obtained by simply overlaying the printed check data with a transparent grid. The printout of such a check 10 (data) is best illustrated in FIG. 1. where the date 12 is printed in row 31, between columns 49 and 54, the written check amount 14 is printed in row 29 between columns 6 and 39 and the numerical amount 16 in row 31 between columns 62 and 76. The check stub data 13 appears in rows 4 through 19. The name of the payee 18 appears in row 34 starting at column 7 and the payee's address 20 therebelow in the subsequent three rows 35 through 37. The check number 11 appears in row 26 between columns 69 through 75.

The array locations (row/column) of the host check data are entered into a control file. It should be noted that the data outputted by the host program consists of printer codes which include both print character and function codes. Carriage return and line space codes indicate the start and termination of a print line (row). Each space, and character code represents a column. With this print code information as a basis, a matrix array can be constructed in computer memory within the control file representing the check data from the host program wherein each printed line equals a row and each horizontal print position equals a column. This initial creation and formatting of a control file is only necessary once for each different host program. Thereafter the control file will be employed to identify the separate host check data in the control file row/column matrix array. The control file is then stored in a non-volatile memory device such as a disk file and thereby available to the computer on which the host and the separate check programs have been installed.

A sequential series of check numbers are selected by the user for each bank account that may be used by the host program. Each check series starts with a different set of initial significant digits. The significant starting check number digits are entered into the control file along with their associated MICR information, bank name/address, payor name/address and the transit number.

The host program is now activated (by the separate check program) to process data and to printout check data therefrom. The print data instructions generated by the host program are sequentially intercepted at the computer system operating level or print driver for each individual check page. From these intercepted data a matrix array is formed in computer memory representing the host program check data for each check with each printed line being equal to a row and each horizontal print position being equal to a column. The host program check data within the matrix array is then interpreted, as for example, by comparison to the previously generated control file matrix array so that each check data element is identified and quantified. The separate check program, in effect, examines the data input from the host program and constructs, in computer memory, a representation of the check that was to have been printed by the host program. The separate check program uses the coordinate (row/column) information in the control file to decipher this host program information into meaningful fields. The field designated as the check number is examined first. Depending on what was specified in the control file as the number of significant digits, the first one, two, or three digits of the check number are extracted and used to represent, for example, the bank account control number. This control number is used to retrieve information previously entered into the control file such as, but not limited to the MICR number, bank account name/address, and transit number. This information combined with the intercepted host signal data is sufficient to permit the printing of a check under the direction of the separate check program (TSR or print driver) on a blank sheet of paper for each intercepted check.

Figure 2:
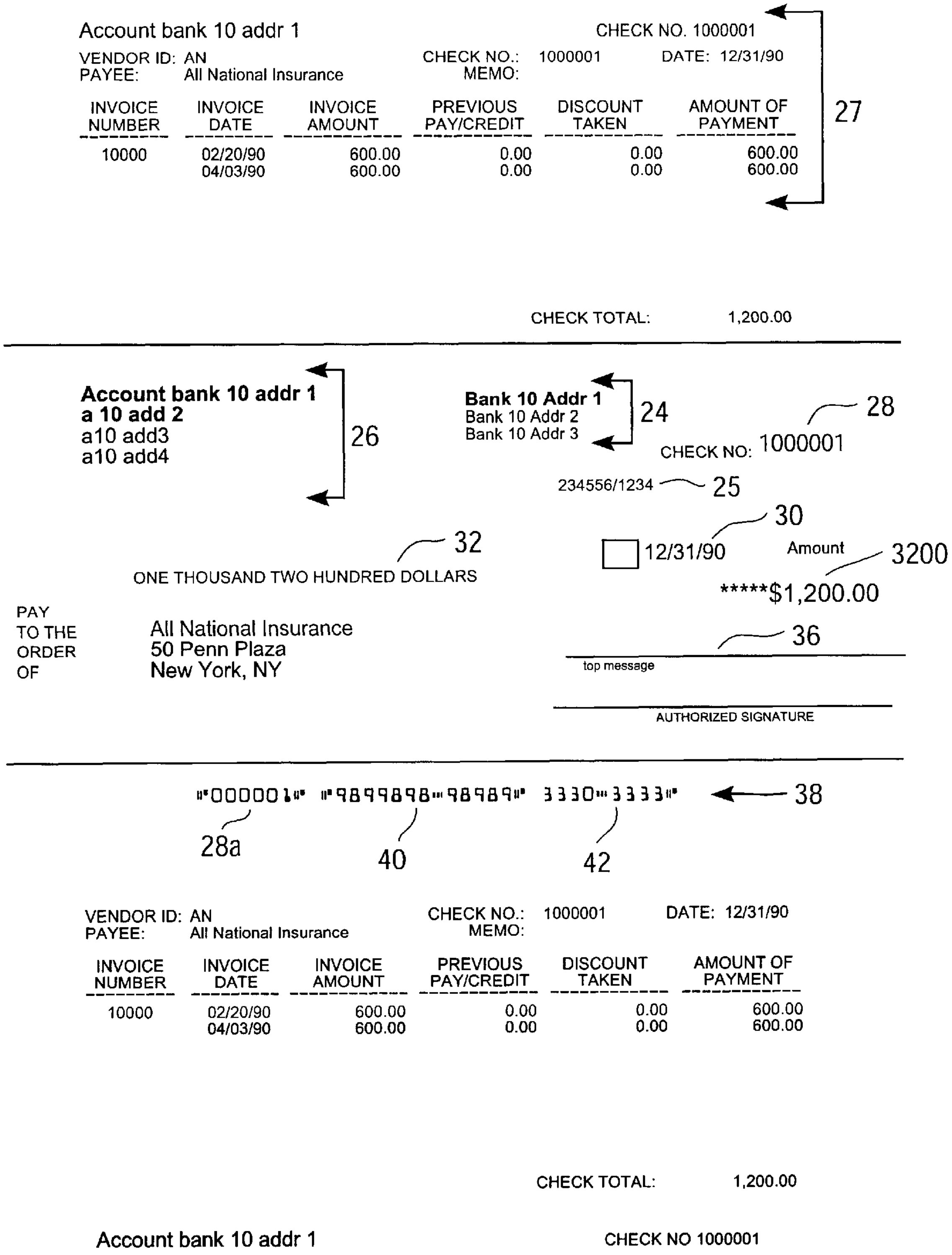
FIG. 2 is a representation of a check printed by the method of this invention from host program supplied data.

A laser printer equipped with MICR magnetic toner and with the MICR character font installed therein is used to print the checks illustrated in FIG. 2 as described above. The separate check program has been programmed to automatically cause the laser printer to imprint on a blank paper sheet all the necessary check information.

Reference is now made specifically to FIG. 2. Under the data input of the separate check program the laser printer is caused to print on the blank sheet face 22 the bank identification/address 24, the transit number 25, the stub information 27, the account name/address 26, the check number 28, the date 30, the check amount 32/32*a*, and the payee/address 34 and the signature line 36. During the same printing operation the computer check program automatically causes the laser printer to print (with the proper font) the MICR information in the "Clear Band" area 38. The MICR information includes the check number 28*a*, the transit number 40 and account number 42.

The method as set forth above may be practiced, if preferred, in the form of a computer program used in conjunction with a computer installed host program for printing checks on partially preprinted forms. The basic method includes the following steps: 1) loading into computer memory a program designed to intercept computer output directed to a printer and which program terminates and stays resident in memory (TSR); 2) installing onto the computer a host program normally used to print checks on preprinted forms such as accounting and payroll programs; 3) instructing the host program to print out one or more check samples; 4) intercepting as per step 1 above the sample check data being sent to the printer by the host program; 5) reformatting and printing the sample check data on a laser printer within a grid system of rows and columns; 6) identifying and entering the row and column locations of the sample check data into a control file; 7) assigning a different set of starting check number digits for each different bank account; 8) entering into the control file the different set of starting digits and associated therewith additional necessary check information for each of the bank accounts such as for example, bank name/address, account number, MICR codes, transit numbers, etc.; 9) storing the control file in a non-volatile memory (disk file); 10) clearing both the host program and the TSR program from the computer memory; 11) loading into computer memory a check formatting TSR program and reverting control to the computer operating system; 12) activating the host program to print a check on preprinted check forms; 13) intercepting print data being sent to the printer by the host program and storing the print data in a matrix array of rows and columns with each printed line equal to a row and each horizontal position equal to a column for each full check page; 14) interpreting the intercepted check data according to the row and column locations of the sample check data and the additional information associated with the starting digits in the control file; 15) reformatting the interpreted data into a standard check format and directing the reformatted data to a laser printer; 16) repeating steps 13 through 15. Steps 1 through 8 represent a one time initial installation procedure.

The method described above can also be practiced by substituting the following procedure for steps 1 through 5; 1) installing onto the computer a host program normally used to print checks on preprinted forms (accounting or payroll programs); 2) instructing the host program to print one or more sample checks; 3) overlaying the printed sample check with a transparent sheet having row and columns printed thereon; 4) entering in a row/column matrix array the row/column location of the sample check data into a control file;

The foregoing description of the inventive method in conjunction with the contents of Appendix A and the computer program flow charts of Appendix B (as set forth hereinafter) provide sufficient information for a person skilled in the art as for example, a programmer, to formulate and write a computer program which will be capable of performing the aforementioned and described check printing method.

Obviously many modifications and variations of the present invention are possible in the light of the above teachings. It is therefore understood that, within the scope of the appended claims, the invention may be practiced otherwise than specifically described.

APPENDIX A

Record Layout for control Record

| | | | |
|---|---|---|---|
| 01–03 | 3 | RECNO | Record Number "000" = Control Record |
| 04 | 1 | ACCTLNTH | Number of significant ID bytes in Check # (1–3) |
| 05 | 1 | CHRBYTES | Number of bytes in Check # |
| 06–09 | 4 | CHKCOOR | Coordinates of Check # (RRCC) of leftmost position |
| 10–13 | 4 | AMTCOOR | Coordinates of Amount (numeric printing) |

APPENDIX A-continued

| | | | |
|---|---|---|---|
| 14–15 | 2 | AMTMAX | Maximum print positions of numeric amount |
| 16–19 | 4 | SPELCOOR | Coordinates of spelled out amount |
| 20–21 | 2 | SPELMAX | Maximum print positions of spelled out amount |
| 22–25 | 4 | DATECOOR | Coordinates of check date |
| 26–27 | 2 | DATEMAX | Maximum print positions of check date |
| 28–29 | 2 | TOPLINE | Top print line on stub |
| 30–31 | 2 | STUBLNES | Number of lines for stub |
| 32–35 | 4 | VOIDCOOR | Coordinates of VOID indication |
| 36–37 | 2 | VOIDMAX | Number of characters in VOID indication |
| 38–47 | 10 | VOIDPATN | First 10 characters of VOID indication |
| 48–51 | 4 | PAYCOOR | Coordinates of Payee Name & Address (Top leftmost Character) |
| 52–53 | 2 | PAYMAX | Maximum Length of Payee Name & Address |
| 54 | 1 | PAYLINES | Number of row allocated for Payee Name & Address |
| 55–58 | 4 | OFFVERT | Offset Vertical - Decipoints |
| 59–62 | 4 | OFFHORZ | Offset Horizontal - Decipoints |
| 63 | 1 | TRAYCHK | Tray designator for check forms |
| 64 | 1 | TRAYNORM | Tray designator to reestablish after check printed |
| 65–68 | 4 | INPPORT | LPT1 . . . COM4 printer output ports for checks |
| 69–72 | 4 | OUTPORT | LPT1 . . . COM4 printer input port for checks |
| 73–75 | 3 | MAXACCTS | Maximum Bank Accounts Allowed |
| 76–77 | 2 | PGELNTH | Number of Lines on single page |
| 78 | 1 | SKIPNUM | Number of Lines to skip for first page |
| 79–86 | 8 | CPASSWRD | Control Record Password |
| 87–109 | 23 | IDMSG | File verification ID “MBS_Multi_Check_Control” |
| 110–500 | 391 | Filler | |

Record Layout for Bank Account Information

| | | | |
|---|---|---|---|
| 01–03 | 3 | RECNO | Checking Account Number - First digits of Check Number |
| 04–38 | 35 | BANK1 | Bank Name & Address Line 1 |
| 39–73 | 35 | BANK2 | Bank Name & Address Line 2 |
| 74–108 | 35 | BANK3 | Bank Name & Address Line 3 |
| 109–143 | 35 | BANK4 | Bank Name & Address Line 4 |
| 144–155 | 12 | TRANSTOP | Transit Top |
| 156–162 | 7 | TRANSBOT | Transit Bottom |
| 163–197 | 35 | ACCT1 | Bank Name & Address Line 1 |
| 198–232 | 35 | ACCT2 | Bank Name & Address Line 2 |
| 233–267 | 35 | ACCT3 | Bank Name & Address Line 3 |
| 268–302 | 35 | ACCT4 | Bank Name & Address Line 4 |
| 303 | 1 | BOLDLNE2 | Bold print Bank Account Address Line 2 ? (Y/N) |
| 304–331 | 28 | MICRLINE | MICR Line |
| 332 | 1 | NUMSIG | Number of Signature Lines (1 or 2) |
| 333–367 | 35 | SIGMSG | Top Signature Message |
| 368–402 | 35 | LOGOFILE | File and Path to Logo Graphics File |
| 403–437 | 35 | SIGFILE | File and Path to Signature File |
| 438 | 1 | MICRSW | “Y” = MICR Checks “N” = Pass Through |
| 439 | 1 | NUMCOPY | Number of “extra” copies |
| 440–447 | 8 | BPASSWRD | Bank Account password |
| 448–500 | 53 | | Filler |

TSR CHECK SPECIFICATIONS

| | |
|---|---|
| ACCTBOLD | String to set Account Name in Bold - ^(OU^(s1ps3b12v4T |
| ACCTNORM | String to set Account Name to regular font - ^(OU^(s1psb12vT |
| ACCTPOS | String to set Account Print position - ^&a2016v000H |
| AMTNUMER | Amount in Numerals |
| AMTPOS | Position of amount in numerals - ^&a2932v4296H |
| AMTWORDS | Extracted spelled-out amount |
| AMTWRDPOS | Position of Amount Words - ^&a2888v1H^(s0pq2v3t10h0s1X^(OU^&16D |
| BANKNO | Extracted from Check Number |
| BNKADR2PS | Bank Address 2 position - ^&a28880H |

APPENDIX A-continued

| | |
|---|---|
| BNKADRSEL | Bank Address font selection - ^&a38880H^(OU^(s1psb8v4T |
| BNKNMEPOS | Bank Name position - ^&a1960v28880H^(OU^(s1ps3b10v4T^&180 |
| BOTCHKNO | To print bottom stub check number - “^&a6340v3340H^)OU^(s1ps3b10v4TCHECK NO.” ^&a6340v4160H^(OU^(s1psb14v4T” + CHKNUN |
| BOTCOMP | To print bottom stub Company Name - “^&a6340v1H^(OU^(s1psb12v4T” + ACCT1 |
| BOTPOSTN | Bottom stub start print positioning - ^&a4582v1H |
| BOXSTRING | String to start alignment box - ^&a2682v3356H^*c3v219hoP^*c136v3h0P^&a+219H ^*c136v3h0P^&a–219h+136V^*c3v222h0P |
| CARRRTN | Carriage return ASCII Decimal 013 |
| CHECKDTE | Check date extracted from data stream |
| CHECKTRAY | Select printer tray for checks - “^1” + TRAYCHK + “H” |
| CHKNPAD | Padded check number limited to leftmost 6 positions |
| CHKNUM | Check number |
| CONDSTUB | String to set for condensed printing - ^(8U^(s0p122h10v0s0b3T^&18D |
| DATEPOS | Check date position - ^&a2767v3616H^(s0p12v3t10h0s1X^(OU |
| EIGHTLPI | Eight lines per inch - ^&18D (lower case L) |
| FORMFEED | Form feed ASCII Decimal 012 |
| LINEFEED | Line feed ASCII Decimal 010 |
| LNECNT | Line number for display in front of each line printed for ruler |
| LNESTRING | ^&a1608v1H^*c3v195h0P^a1608v4806H^*c3v195h0P ^&a1680v1H^*cv195h0P^&a1680v4806H^*c3v195h0P |
| MICRPOS | Position of MICR line - ^&a4018v0668H^(5Q(spsb8v8h177T |
| NORMSTUB | String to set normal stub printing - ^(8U(s0p12v3t10h0s1X^(OU^&16D |
| NORMTRAY | Select printer tray for non-checks - “^1” + TRAYNORM + “H” |
| OFFSET | String to set offset - OFFSET1 + OFFVERT + OFFSET2 + OFFHORZ + OFFSET3 |
| OFFSET1 | String to begin cursor offset - ^&l (lower case L) |
| OFFSET2 | String to continue cursor offset - z (lower case) |
| OFFSET3 | String to end cursor offset command - U (upper case) |
| PAYEEAD1 | Payee address Line 1 |
| PAYEEAD2 | Payee address Line 2 |
| PAYEEAD3 | Payee address Line 3 |
| PAYEEAD4 | Payee address Line 4 |
| PAYEENME | Payee name |
| PAYEEPOS | ^&a3128v396H |
| PAYEEPOS2 | ^&a396H |
| PRTRESET | Printer reset string - ^E |
| RULER | “--- . . . 5 . . . 10 . . . 5 . . . 20 . . . 5 . . . 30 . . . 5 . . . 40 . . . 5 . . . 50 . . . 5 . . . 60 . . . 5 . . . 70 . . . 5 . . . 80” |
| SIGLNSTG | String for signature line - ^&a3267v3096H^*c3v2160h0P |
| SIGMSGST | String for position Signature message - Centered in 45 characters - ^&a3340v3096H^(OU^(slpsb8v4T^&16D |
| SIXLPI | Six lines per inch - ^&16D (lower case L) |
| TOPCHKNO | ^(OU^slpsb14v4T^&alv4360H” + CHKNUM + CARRRTN |
| TOPCOMP | To print top stub Company Name - “^&alv1H^(OU^(slspb12v4T” + ACCT1 |
| TOPPOSTN | Top stub start print positioning - ^&al20v1H |
| TRNSTPOS | Transit number position - ^&a3050H^(OU(slpsb8v4T ^16D |
| VOID | True if void |
| VOIDPOSTN | Position to print VOID - ^&a3462v3096H^(OU(slps3b12v4T |

TSR Programming

Terminate and Stay Resident (TSR) techniques and sample programs can be found in “DOS 5: A Developer’s Guide” by Al Williams published by N & T Books (a Division of N & T Publishing, Inc., 501 Galveston Drive, Redwood City, CA 941063 - ISBN 1-55851. pp 507–597

ISR Programming

Interrupt Service Routines (ISR) techniques and sample programs can be found in “DOS 5: A Developer’s Guide” by Al Williams published by N & T Books (a Division of M & T Publishing, Inc., 501 Galveston APPENDIX A-continued Drive, Redwood City, CA 941063 - ISBN 1-55851. pp 29–38 & 45–59

PRINTING SPECIFICATIONS

Normal Print Mode

1. Print PRTRESET
2. Print OFFSET
3. Print CHECKTRAY
4. Print TOPCOMP
5. Print TOPCHKNO
6. Print BOTCOMP
7. Print BOTCHKNO
8. If STUBLNES > 12 then Print CONDSTUB else Print NORMSTUB
9. Print TOPPOSTN
10. Loop Print of all lines in STUB (use STUBLNES for loop count compare)
11. Print CARRRTN + LINEFEED after each line
12. Print BOTPOSTN
13. Loop Print of all lines in STUB (use STUBLNES for loop count compare)
14. Print CARRRTN + LINEFEED after each line
15. Print BOXSTRING
16. Print LNESTRING
17. Print ACCTPOS
18. Print ACCTBOLD
19. Print ACCT1 + CARRRTN + LINEFEED
20. If BOLDLNE2 not = "Y" then Print ACCTNORM
21. Print ACCT2 + CARRRTN + LINEFEED
22. If BOLDLNE2 = "Y" then Print ACCTNORM
23. Print ACCT3 + CARRRTN + LINEFEED
24. Print ACCT4 + CARRRTN + LINEFEED
25. Print BNKNMEPOS + BANK1 + CARRRTN + LINEFEED
26. Print BNKADRSEL + BANKADR2PS + BANK2 + CARRRTN + LINEFEED
27. Print BANKADR2PS + BANK3 + CARRRTN + LINEFEED
28. Print BANKADR2PS + BANK4 + CARRRTN + LINEFEED
29. Print CARRRTN + LINEFEED
30. Print TRNSTPOS + TRANSTOP +"/"+ TRANSBOT + CARRRTN + LINEFEED
31. Print DATEPOS + CHECKDTE
32. PRINT AMTWRDPOS + AMTWORDS
33. Print PAYEEPOS + PAYEENME + CARRRTN + LINEFEED
34. Print PAYEEPOS2 + PAYEEAD1 + CARRRTN + LINEFEED
35. Print PAYEEPOS2 + PAYEEAD2 + CARRRTN + LINEFEED
36. Print PAYEEPOS2 + PAYEEAD3 + CARRRTN + LINEFEED
37. Print PAYEEPOS2 + PAYEEAD4 + CARRRTN + LINEFEED
38. Print AMTPOS + AMTNUMER
39. If not VOID Print MICRPOS + "/" + CHKNPAD + "/" + MICRLINE (note - SPACE after second "/")
40. If NUMSIG not = 1 then Print SIGLNSTG
41. If SIGMSG not null the Print SIGMSGT + SIGMSG (centered 45 Characters)
42. If LOGOFILE not null then Print from LOGOFILE
43. If SIGFILE not null and not VOID then Print from SIGFILE
44. If VOID then Print VOIDPOSTN + "V-O-I-D"
45. Print FORMFEED
46. Print PRTRESET
47. Print NORMTRAY Grid Print Mode 1. Print PRTRESET
2. Print NORMTRAY
3. Print CONDSTUB
4. Print RULER
5. Loop through each line Printing LNECNT + " " + Stored Line including Carriage Return LF
6. Print PRTRESET

Having thus described the invention, what is claimed as novel and desired to be secured by Letters Patent is:

1. A computer program product for use in conjunction with a computer system, the computer program product comprising a computer readable storage medium and a computer program mechanism embedded therein, the computer program mechanism comprising:

(a) a first set of instructions for receiving check-printing data for a check to be printed, the check-printing data including a specified check number having a check number prefix that is unique to a respective bank account, wherein the received check-printing data does not include a bank account number for the respective bank account, the first set of instructions including instructions for accessing a control file using the check number prefix as an index, the control file having stored therein a plurality of bank account data sets, each bank account data set associated with a respective one of a plurality of bank accounts and a respective one of a plurality of unique check number prefixes; the first set of instructions including instructions for responding to the specified check number by determining which of the unique check number prefixes is included in the specified check number and for retrieving from the control file the bank account data set corresponding to the determined unique check number prefix, the retrieved bank account data set including the respective bank account number; and (b) a second set of instructions for formatting a check for printing on a substantially blank sheet of paper, the formatted check including the specified check number and the bank account data set retrieved by the first set of instructions, the retrieved bank account data set corresponding to the unique check number prefix included in the specified check number.

2. The computer program product of claim 1, wherein each of the bank account data sets includes bank name and address information, a bank account number, a MICR code, and a transit number.

3. The computer program product of claim 1, wherein the first set of instructions include:

(a1) instructions for receiving check-printing data produced by a host check-printing program, the check-printing data including the specified check number; and (a2) instructions for extracting the specified check number from the check-printing data.

4. The computer program product of claim 1, wherein the first set of instructions further include instructions for accessing a lookup table indexing the plurality of unique check number prefixes to the plurality of bank account data sets.

5. A computer program product for use in conjunction with a computer system, the computer program product comprising a computer readable storage medium and a computer program mechanism embedded therein, the computer program mechanism comprising:

(a) a first set of instructions for receiving check-printing data produced by a host check-printing program, the check-printing data including a specified check number for a check to be printed, the specified check number having a check number prefix that is unique to a respective bank account, wherein the received check-printing data does not include a bank account number for the respective bank account;

(b) a second set of instructions for extracting the check number prefix of the specified check number within the check-printing data;

(c) a third set of instructions for accessing a control file, the control file having stored therein a plurality of bank account data sets, each bank account data set being associated with one of a plurality of unique check number prefixes, the third set of instructions including instructions for retrieving from the control file the bank account data set corresponding to the extracted check number prefix using the check number prefix as an index; and (d) a fourth set of instructions for formatting a check for printing on a substantially blank sheet of paper, the formatted check including the specified check number and the retrieved bank account data set.

6. The computer program product of claim 5, wherein each of the bank account data sets includes bank name and address information, a bank account number, a MICR code, and a transit number.

7. The computer program product of claim 5, wherein the third set of instructions further include instructions for accessing a lookup table indexing the plurality of unique check number prefixes to the plurality of bank account data sets.

8. A method of printing checks, comprising:

(a) receiving check-printing data that includes a specified check number for a check to be printed, the specified check number having a check number prefix that is unique to a respective bank account, wherein the received check-printing data does not include a bank account number for the respective bank account;

(b) extracting the check number prefix from the specified check number;

(c) retrieving a bank account data set associated with the extracted check number prefix from a control file using the check number prefix as an index, the bank account data set including the respective bank account number; and (d) formatting a check for printing on a substantially blank sheet of paper, the formatted check including the specified check number and the retrieved bank account data set.

9. The method of claim 8, wherein the receiving includes receiving the check-printing data from a host check printing program.

10. The method of claim 8, wherein each of the bank account data sets includes bank name and address information, a bank account number, a MICR code, and a transit number.

11. The method of claim 8, wherein the control file stores a plurality of bank account data sets, each data set being associated with a pre-determined unique check number prefix.

12. A method of printing checks, comprising:

(a) receiving a plurality of bank account data sets each associated with a respective one of a plurality of bank accounts, each bank account data set including an associated bank account number;

(b) associating each of a plurality of unique prefixes with a respective one of the bank accounts, wherein the unique prefixes are included in check numbers for checks to be printed and wherein the unique prefixes are unequal to the associated bank account numbers;

(c) storing the plurality of bank account data sets in association with corresponding ones of the unique prefixes in a control file;

(d) receiving data from a host check-printing program, the data formatted for printing a check on a pre-printed check form, the data having a check number containing a unique prefix, the data not including a bank account number associated with a check to be printed;

(e) examining the data to determine the unique prefix;

(f) retrieving one of the bank account data sets associated with the unique prefix from the control file; and (g) formatting a check for printing on a substantially blank sheet of paper, the formatted check including the check number and the retrieved bank account data set.

13. The method of claim 12, wherein each of the bank account data sets includes bank name and address information, a bank account number, a MICR code, and a transit number.

14. A computer program product for use in conjunction with a computer system, the computer program product comprising a computer readable storage medium and a computer program mechanism embedded therein, the computer program mechanism comprising:

(a) a first set of instructions for receiving check-printing data that includes a specified check number for a check to be printed, the specified check number having a check number prefix that is unique to a respective bank account, wherein the received check-printing data does not include a bank account number for the respective bank account, the first set of instructions including instructions for accessing a control file, the control file using the check number prefix as an index, the control file storing a plurality of bank account data sets, each bank account data set associated with a respective one of a plurality of bank accounts and a respective one of a plurality of unique check number prefixes; the first set of instructions including instructions for responding to the specified check number by determining which of the unique check number prefixes is included in the specified check number and for retrieving from the control file the bank account data set corresponding to the determined unique check number prefix, the retrieved bank account data set including the respective bank account number; and (b) a second set of instructions for formatting data to be used in a financial transaction, the formatted data including the specified check number and the bank account data set retrieved by the first set of instructions.

15. A method of formatting data for use in a financial transaction, comprising:

(a) receiving data that includes a specified check number for a check to be printed but does not include not a bank account number associated with the check to be printed;

(b) extracting a prefix from the specified check number;

(c) retrieving a bank account data set associated with the extracted prefix from a control file using the prefix as an index, the bank account data set including the bank account number associated with the check to be printed; and (d) formatting data to be used in the financial transaction, the formatted data including the specified check number and the retrieved bank account data set.

* * * * *